United States Patent
Shemer et al.

(10) Patent No.: US 11,681,725 B2
(45) Date of Patent: Jun. 20, 2023

(54) TIERED FORENSICS OF IOT SYSTEMS IN CLOUD AND TIME SERIES DATABASES

(71) Applicant: EMC IP Holding Company LLC, Hopkinton, MA (US)

(72) Inventors: Jehuda Shemer, Kfar Saba (IL); Kfir Wolfson, Beer Sheva (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 337 days.

(21) Appl. No.: 16/156,803

(22) Filed: Oct. 10, 2018

(65) Prior Publication Data
US 2020/0117552 A1    Apr. 16, 2020

(51) Int. Cl.
*G06F 16/27* (2019.01)
*G06F 16/38* (2019.01)
*G06F 11/14* (2006.01)

(52) U.S. Cl.
CPC .......... *G06F 16/27* (2019.01); *G06F 11/1471* (2013.01); *G06F 16/38* (2019.01); *G06F 2201/80* (2013.01); *G06F 2201/805* (2013.01); *G06F 2201/82* (2013.01)

(58) Field of Classification Search
CPC ...... G06F 16/27; G06F 16/38; G06F 11/1471; G06F 2201/80; G06F 2201/805; G06F 2201/82
See application file for complete search history.

(56) References Cited

U.S. PATENT DOCUMENTS

| | | | |
|---|---|---|---|
| 6,347,136 B1 * | 2/2002 | Horan | H04M 1/578 379/142.01 |
| 6,424,999 B1 * | 7/2002 | Arnon | G06F 11/1469 709/208 |

(Continued)

FOREIGN PATENT DOCUMENTS

JP    2005-149285    6/2005

OTHER PUBLICATIONS

Birngruber et al., "Total Recall", HPC User Support Tools, ACM, 2 Penn Plaza, Suite 701, New York, NY 10121-0701 USA, Nov. 15, 2015, pp. 1-12, XP058075927, DOI: 10.1145/2834996.2835001, ISBN: 978-1-4503-4000-7.

(Continued)

*Primary Examiner* — Pierre M Vital
*Assistant Examiner* — Vy H Ho
(74) *Attorney, Agent, or Firm* — Workman Nydegger

(57) ABSTRACT

One example method includes creating an empty reconstruction stream database, identifying a data time interval, identifying data sources in which data was stored during the data time interval, reading data from the data sources, where the data read out from the data sources are associated with respective timestamps that fall within the data time interval, inserting the read out data into the empty reconstruction stream database so as to create a high resolution data stream, where the data are ordered in the empty reconstruction stream database according to timestamp, processing the data in the high resolution data stream and, based on the processing of the data, identifying and resolving a problem relating to an operating environment in which the data was initially generated.

20 Claims, 3 Drawing Sheets

(56) References Cited

U.S. PATENT DOCUMENTS

| | | | | |
|---|---|---|---|---|
| 8,346,956 | B2* | 1/2013 | Day | H04L 67/62 |
| | | | | 370/235 |
| 10,417,251 | B2* | 9/2019 | Willson | G06F 16/211 |
| 10,514,837 | B1* | 12/2019 | Li | G06F 3/0482 |
| 10,871,584 | B2* | 12/2020 | Jiao | G01V 1/282 |
| 2003/0204597 | A1* | 10/2003 | Arakawa | G06F 21/80 |
| | | | | 709/226 |
| 2007/0081794 | A1* | 4/2007 | Baynger | H04N 19/159 |
| | | | | 386/331 |
| 2009/0070347 | A1* | 3/2009 | Mignet | H04N 19/63 |
| 2012/0310850 | A1* | 12/2012 | Zeng | G06Q 30/018 |
| | | | | 705/317 |
| 2016/0071228 | A1* | 3/2016 | Wendel | G08B 13/19676 |
| | | | | 348/148 |
| 2017/0235298 | A1* | 8/2017 | Nixon | G05B 23/0264 |
| | | | | 700/19 |
| 2018/0084081 | A1* | 3/2018 | Kuchibhotla | H04L 67/1097 |
| 2018/0146041 | A1 | 5/2018 | Moustafa et al. | |
| 2018/0191867 | A1 | 7/2018 | Siebel et al. | |
| 2018/0365571 | A1* | 12/2018 | Rui | H04L 41/142 |
| 2019/0007757 | A1* | 1/2019 | Reitsma | H04Q 9/00 |
| 2019/0026349 | A1* | 1/2019 | Reilly | G06F 11/3006 |
| 2019/0208386 | A1* | 7/2019 | Flasher | H04W 88/16 |
| 2020/0073763 | A1* | 3/2020 | Saini | G06F 16/2365 |
| 2020/0351116 | A1* | 11/2020 | Jetzfellner | H04L 12/2818 |

OTHER PUBLICATIONS

International Search Report and Written Opinion for PCT/US2019/041125 and dated Sep. 16, 2019.

Radha et al., "Similarity search in Recent Biased time series databases using Vari-DWT and Polar wavelets", Emerging Trends in Robotics and Communication Technologies (Interact), 2010 International Conference On, IEEE, Dec. 3, 2010, pp. 398-404, XP031890050, DOI: 10.1109/INTERACT.2010.5706187, ISBN: 978-1-4244-9004-2.

* cited by examiner

TIERED FORENSICS OF IOT SYSTEMS IN CLOUD AND TIME SERIES DATABASES

FIELD OF THE INVENTION

Embodiments of the present invention generally relate to data protection. More particularly, at least some embodiments of the invention relate to systems, hardware, software, computer-readable media, and methods directed to processes for reconstructing time series datastreams with data from multiple different sources.

BACKGROUND

With the proliferation of the so-called Internet of Things (IoT), the size and number of data streams generated by IoT devices and transmitted to an on-premises data center, or cloud data center, are ever increasing. In many cases, data streams are appended to a time series database, which typically saves only the recent data in highest resolution, while consolidating or trimming the older data. This approach to storage of the data limits the quality of forensics that can be performed in IoT systems after an issue occurs, and can also negatively impact the retraining of machine learning algorithms on lost data.

To illustrate, when an event occurs that affects an IoT system, IoT device, and/or associated data, there may be a need to be able to access the backed up IoT data in relatively high resolution. However, it may be difficult to obtain and reconstruct the data, at least in part because portions of the data may reside in a variety of different locations. Thus, the locations where the data may be expected to be stored may not always have all the data needed. This can occur as a result of data policies in time series databases, such as policies that cause older data to be deleted or down sampled. A related problem is that data policies may not provide for storage of all the data in high resolution.

As well, IoT devices typically do not have significant data storage capabilities. Thus, the IoT devices cannot be relied upon for storing large amounts of data. This, in turn, may be a cause for implementation of data policies such as down sampling which are problematic in their own right, as noted.

Finally, backups of time series DB or IoT devices may be uncoordinated. That is, time series DB backups may contain older data but these backups may not be accessible to the runtime system. As well, some larger devices like surveillance cameras may even have backups of historical data. Again, however, this backup data is not typically accessible by the runtime system.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
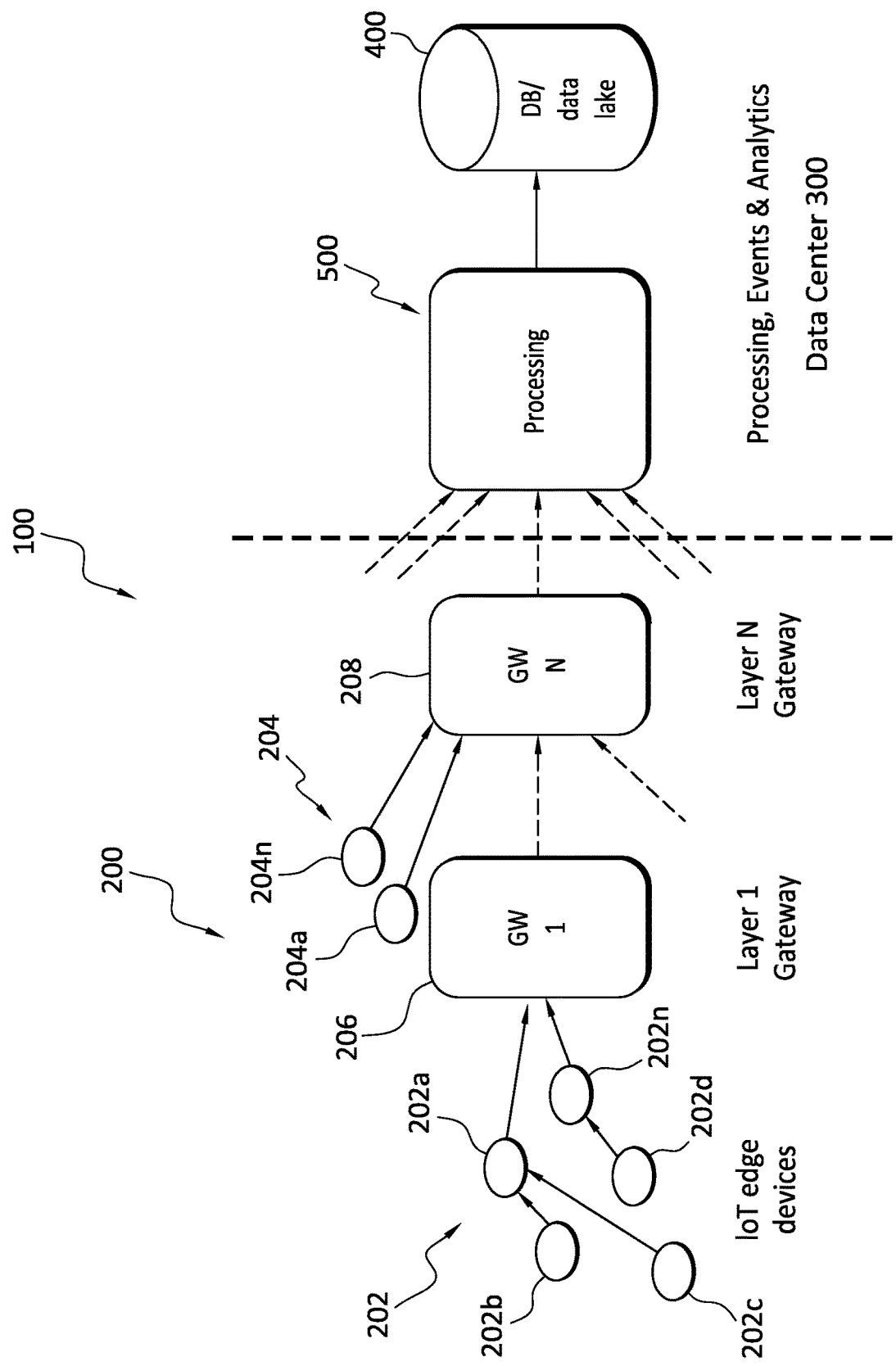
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods directed to processes for reconstructing time series data streams with portions of data residing at multiple different sources. The various portions of data may be associated with different respective resolutions such that, for example, one portion of data may be backed up at a first resolution, and another portion of data may be backed up at a second resolution that is different from the first resolution.

In general, embodiments of the invention stitch together data from multiple sources in order to reconstruct a data stream at high resolution. Regardless of where the data is stored, or the resolution of the stored data, the data stream may be reconstructed by assembling the data in a desired order or sequence using metadata, such as unique ID values or timestamps, for example. Some embodiments of the invention are able to construct, on an ad hoc basis, a data stream of any desired size even if that data stream, as such, did not previously exist. To illustrate, a database (DB) may only be large enough to hold 1 M samples, but 3 M samples are needed for analysis or some other purpose. In circumstances such as these, embodiments of the invention are able to construct a data stream of any desired size, such as 3 M samples for example, without being constrained by the size of the DB. It should be noted that while the 3 M data stream, for example, may never have existed, as such, in the DB, such a data stream may nonetheless be referred to herein as having been reconstructed. Moreover, when the data stream is reconstructed, embodiments of the invention may ensure that the reconstructed stream will be able to fit in the database. To this end, embodiments of the invention may set, or override, as applicable, a database storage policy to ensure that the reconstructed data stream, whether measured in terms of disk space, DB record count, or any other metric, can be accommodated by the database.

Advantageously then, embodiments of the invention may provide various benefits relative to conventional systems and methods. To illustrate, embodiments of the invention may enable performance of forensics, debugging, and other processes such as retraining of machine learning algorithms, which require a high resolution data stream for best results. The results of these forensics and debugging processes can be used to identify and resolve problems with the operation of a system, application, or device, for example, in an IoT or other environment. As well, embodiments of the invention include data restore processes that employ a high resolution data stream that has been reconstructed as disclosed herein. Further, embodiments of the invention are able to reconstruct a high resolution data stream even if portions of the data used for reconstruction are relatively low resolution, such as due to down sampling or other downscaling processes, and/or are stored in a variety of disparate locations. As well, embodiments of the invention enable construction/reconstruction of data streams of any desired size. As such, the data streams can be reconstructed as far back in time as needed.

As the foregoing examples illustrate, embodiments of the invention may improve the operation of a computing system, or element of a computing system, such as by reducing, or eliminating, the need or requirement for large databases to hold a high resolution data stream in its entirety. Further, embodiments of the invention, by reconstructing a high resolution data stream, enable problem diagnosis and resolution in a computing system. Still further aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

At least some particular embodiments of the invention may be employed in connection with an IoT environment having one or more IoT edge components which may include, for example, IoT sensors, IoT actuators, and/or, any other IoT devices that collect and/or generate information and/or transmit information concerning the environment in which they are disposed, and the IoT environment may also include IoT devices that are responsive to commands to modify some aspect of their environment. To illustrate, IoT edge components include IoT sensors for physical security and disaster detection. Other IoT edge components include surveillance cameras, motion detection sensors and other edge devices that may be used to detect intruders and sound burglar alarms. Smoke and gas detectors may be used to trigger fire alarms and get extinguishers in action. Regardless of their configuration or intended use, IoT edge devices may also be configured to retrievably store data concerning their environment, operations, and/or commands received from an external system or device. Further details concerning an example operating environment in which IoT edge devices may be employed are provided below.

Where data protection operations, such as backup and/or restore operations, using a reconstructed high resolution data stream for example, are performed, at least some embodiments may be employed in connection with a data protection environment, such as the Dell-EMC DataDomain environment, which can implement backup, archive, restored, and/or disaster recovery, functions. However, the scope of the invention is not limited to this example data protection environment and extends, more generally, to any data protection environment in connection with which data is created, saved, backed up and/or restored.

The data protection environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may generally comprise, or consist of, a general IoT system that consolidates edge devices to gateways, and then to a central backend where most of the processing is done. After initial processing, data is typically saved in a time series database for analytics. Examples of such time series databases, which may be employed in embodiments of the invention, but which are not required, are InfluxDB, Dalmantiner DB, and OpenTSDB.

As shown in FIG. 1, the operating environment 100 may include a system 200 that may comprise an array 202 of one or more IoT edge devices 202a . . . 202n, one, some or all, of which may be IoT sensors, although none of the IoT edge devices are required to comprise or consist of a sensor. More generally, IoT edge devices, as contemplated herein, include, but are not limited to, any physical device that includes one, some, or all, of electronics, software, sensors, and connectivity which enables the IoT edge device to connect and exchange data with other devices, which include, but are not limited to, other IoT edge devices. As such, the sensors disclosed herein are but non-limiting examples of IoT edge devices in connection with which embodiments of the invention may be employed.

With continued reference to FIG. 1, any number of arrays may be employed and, accordingly, the example system 200 includes an additional array 204 with one or more sensors 204a . . . 204n, one, some, or all, of which may be IoT sensors. IoT sensors may alternatively be referred to as IoT edge sensors and embrace, but are not limited to, sensors, actuators or any other devices that produce information and/or are responsive to commands to control the environment they are in. As used herein, the term sensors embraces both sensors, such as those examples listed immediately below, and alarms, and sensors within the scope of this disclosure may operate automatically and/or may be manually activated. In general, the type, number, location, and combination, of sensors may be based on considerations including, but not limited to, the type(s) of threats most likely to be encountered, and the proximity of potential threat sources to the datacenter, and the amount of time needed to implement one or more preemptive actions once a threat has been identified.

IoT sensors that may be employed in connection with embodiments of the invention include, but are not limited to, fire and smoke detectors, gas detectors, leak and flooding detectors, humidity gauges, temperature gauges, seismometers, motion detectors, security cameras with automatic motion/threat detectors, burglar alarms, voltage and electric current detectors, pressure sensors, airflow meters, noise detectors, and chemical detectors and sensors. Other IoT sensors within the scope of the invention may be manually activated, such as a manually activated fire alarm for example, or an intruder alert or panic button, as another example. The foregoing and/or other IoT sensors can be employed in any combination, type, and number.

With continued reference to FIG. 1, the system 200 may optionally include one or more gateways, such as gateway 206 and gateway 208 for example. Any number 'n' of gateways may be used. In general, gateways refer to systems and/or devices configured to consolidate communication and management of multiple edge devices, such as the sensors in IoT sensor arrays 202 and 204, for example. Gateways may be employed where, for example, edge device networking capabilities are local in nature, whether with respect to power and/or connectivity, and the gateway is used by the edge devices to connect to the internet and/or to another communication network.

As shown, a gateway may be dedicated to a particular array or group of sensors, although that is not required. In the illustrated example, the sensor array 202 communicates by way of gateway 206, while the sensor array 204 communicates by way of gateway 208. Any of the connections between the elements shown in FIG. 2 may be wireless, or hardwired, connections. As also indicated, gateways such as gateway 206 and gateway 208 may be referred to as corresponding to respective layers, such as Layer 1 and Layer 'n,' for example. The layers may be layers in a communication configuration. Moreover, the gateway in the highest layer in a communication configuration, such as the gateway 208, may communicate with one or more other gateways at lower layers, such as the gateway 206. As well, the gateways may be arranged in series with each other, although that is not necessarily required and a parallel gateway arrangement could also be used. In the example illustrated configuration, the layer 'n' gateway 208 consolidates all communications from the lower layers, such as layer 1.

As further indicated in FIG. 1, data storage functionalities associated with the system 200 may be implemented by a datacenter 300, which may be a cloud datacenter, although that is not required. The datacenter 300 may include storage 400 that may comprise, or consist of, one or more time series databases (DB) and/or data lake configuration, either or both of which may also be elements of a datacenter. In general, the storage 400 embraces any system and/or components operable to store data in a high resolution time series, and respond to read and write requests. In more detail, the storage 400 may be used to save at least some of the incoming data from the sensors in IoT sensor arrays 202 and 204, after that data has been processed by a processing server 500 which is able to communicate with the storage 400. As noted herein, the sensors in the IoT sensor arrays 202 and 204 may also store data.

In general, the processing server 500 and/or other components may be programmed to receive sensor inputs in the form of data, such as by way of one or more gateways, and perform processing and/or analytics with respect to that sensor data. That is, the raw data provided by the sensors can be received and processed by the processing server 500. The processing server 500 may, but need not, be an element of the datacenter 300.

In general, and as discussed in more detail elsewhere herein, the processing server 500 may be operable to sample and/or reconstruct a data stream in high resolution, or in the highest possible resolution. This reconstruction may involve, among other things, accessing data stored in an IoT sensor array, and accessing data stored in one or more time series databases. In some embodiments, data stream reconstruction and/or data stream sampling may be performed by an entity other than, or in cooperation with, the processing server 500. For example, data stream reconstruction and/or data stream sampling may be cooperatively performed by the processing server 500 and storage 400.

B. Example Host and Server Configurations

Figure 2:
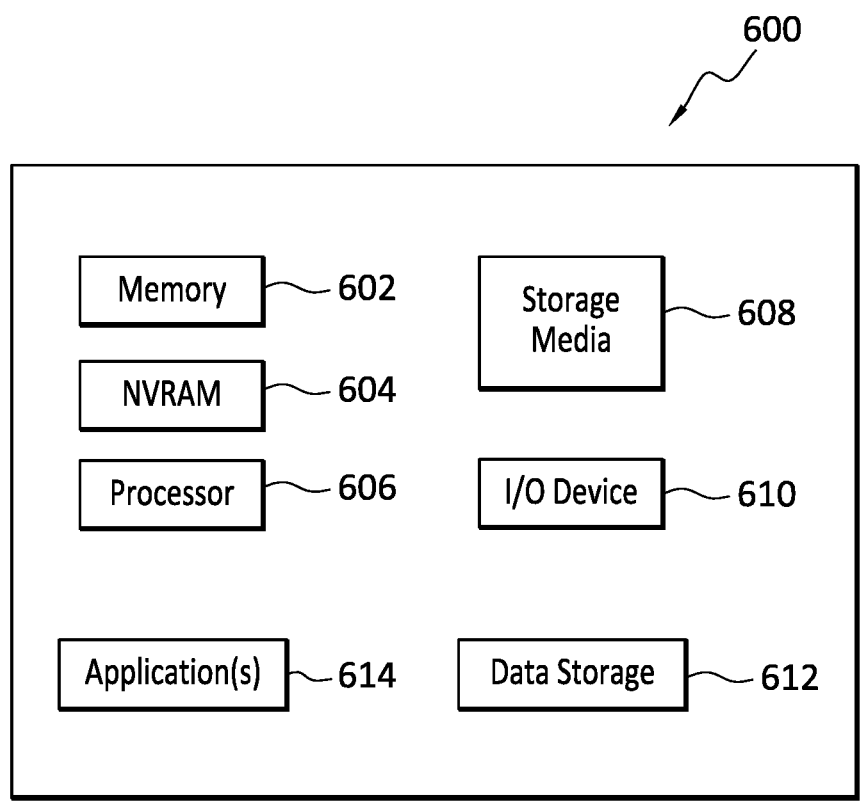
FIG. 2 discloses aspects of an example host configuration.

With reference briefly now to FIG. 2, any one or more of the IoT edge devices 202a ... 202n, 204a ... 204n, gateway 206, gateway 208, data center 300, storage 400, and processing server 500, can take the form of, or include, a physical computing device, one example of which is denoted at 600. As well, where any of the aforementioned elements comprise or consist of a virtual machine (VM), that VM may constitute a virtualization of any combination of the physical components disclosed in FIG. 3.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components 602 of the physical computing device can take the form of solid state device (SSD) storage. As well, one or more applications 614 are provided that comprise executable instructions. Such executable instructions can take various forms including, for example, instructions executable by a processing server 500 to reconstruct a high resolution data stream.

C. Aspects of Time Series Database and Related Operations and Data

With continued reference to the example of FIG. 1, the storage 400, which can take the form of, or include, one or more time series databases, may hold a certain amount of raw data in highest resolution for a period of time, such as several days for example. In order to best use the storage space in a time series database of the storage 400, the processing server 500 may trim, that is, delete, older data and/or reduce the size of older data using various data resolution operators, such as by down-sampling, reducing the number of bits per sample, and/or increasing image compression ratios. Such processes, including down sampling, are particular examples of downscaling processes.

In general, downscaling of old data reflects the convention that the newest data is the most important data, and should thus be retained in the highest resolution possible. However, it is often the case that older, lower resolution, data may be useful. For example, the older data may be used in forensics, after an event of high significance is discovered to have happened or initiated in the past. Such an event can be, for example, an equipment malfunction, a code issue, a medical event, a weather extreme condition, depending on the IoT application. Older data may also be used to retrain machine learning applications, after discovering in hindsight that a certain event was not as it was originally perceived. As used herein, forensics refers to an examination of stored data and/or associated data storage media to identify, preserve, recover, and analyze, the data and/or associated data storage media.

In more detail, a time series database is configured to store events or data that are provided to the time series database in a chronological sequence based on increasing time. This type of functionality is useful where, for example, queries need to be performed to determine when one event occurred relative to another event. Thus, the chronology of events may be relative, rather than absolute where event times are determined relative to a common clock, although either/both type of chronology may be reflected in the stored data. The time intervals between events may be constant and/or may vary. The time series database may include, or have access to, a table that cross-references events with their respective timestamps, where the timestamp may indicate the time that a particular event involving the data occurred and/or when the event/data was stored in the time series database.

At some point, the time series database will fill, giving rise to the need for downscaling so as to be able to continue to save new data without exceeding the storage capacity of the time series database. In general, down sampling, which is one example of downscaling, may involve implementing one or more changes to the rate at which different portions of the data stream are stored in the time series database.

To illustrate with an example, an aircraft jet engine may have about 100K sensors, each of which is generating data that is desired to be retained. Because the associated database has a finite capacity, different sampling rates may be applied to a data stream to ensure that useful data is still collected but not so much data is collected that the database reaches capacity. Thus, a first portion of the jet engine data stream may be sampled, that is, data from the first portion of the data stream may be saved in the time series database, once per second. A second portion of that data stream, which is received at the database later in time than the first portion, may be sampled once every 10 seconds, and a third portion of the data stream, which is received at the database subsequent to the second portion, may be sampled only once per minute. In this way, data from the jet engine continues to be sampled, but not all at high resolution, since to do so would quickly exhaust the capacity of the database.

As will be apparent from this example, the resolution of the sampled data decreases from a maximum in the first portion, to a minimum in the third portion. The portions of data may reflect particular time periods. For example, the first portion of data may be the data that arrives within an initial one minute time period, while the second portion may be the data that arrives in the subsequent five minutes, and the third portion may be the data that arrives between minutes 5 and 10.

The available storage capacity of the time series database, along with parameters such as the sampling rates, and sampling timeframes, can be used to define a sampling and storage policy for a data stream. The storage policy may, but need not necessarily, be calculated to ensure that the high resolution data, at least, is stored in the time series database. The storage policy may also reflect, for example, a first-in-first-out (FIFO) retention policy, to help ensure that only the most recent data is retained in the database.

As new data comes into the time series database, it may replace the older data, which may be backed up to another database/location. Thus, in some instances at least, the time series database may hold the relatively higher resolution data of the data stream, such as the most recent 1 minute of data in the foregoing example, while the lower resolution data of that data stream is stored elsewhere. Regardless of sampling rate or sampling interval, all data in the data stream may be saved even if not sampled, although that saved data may be spread out among a variety of different entities and/or storage locations, all of which may be generally referred to herein as data sources. For example, even if one or more portions of a data stream are not sampled, due to a defined sampling interval for example, such that those portions do not reside in the time series database, those portions are backed up nonetheless. As such, unsampled data can be recovered from those data sources and used in the reconstruction of a high resolution data stream. Finally, it is noted that the various portions of the data stream may have different respective resolutions, reflective of the sampling rate(s) associated with each of those portions.

D. Aspects of Data Stream Reconstruction and Methods

With the foregoing discussion in view, attention is directed now to a discussion of various aspects of data stream reconstruction and associated methods. In general, embodiments of the invention may serve to restore information in a high resolution form by coordinating and stitching together information or data generated by a variety of sources and/or stored in a variety of locations. The various data portions may have different respective resolutions. Data used in the reconstruction of a high resolution data stream may be obtained from any of a variety of different sources including, for example, a time series data base that is holding the data stream information, any IoT devices and/or gateways that may still be holding relevant data, a DB backend data-protection system, and an IoT devices data protection system. The data stored at these sources can be used in the reconstruction of old data in full resolution for forensics, debugging and other cases. Embodiments of the invention are not limited to any particular certain time series DB implementation or data protection application.

Initially, various preparations may be made in advance of a data stream reconstruction process. For example, to facilitate automatic reconstruction of a high resolution data stream, the data backup systems should be accessible for programmatic access. Absent such access, manual or semi-manual operations may be required to be performed. Thus, simplicity and restore times may be improved by providing such programmatic access.

As well, it is desirable for the time series database backups to include, in the metadata associated with those backups, information about the data time interval of the backup of the high resolution data. The sequence of data within the data time interval may be shown by, or derived from, for example, timestamps associated with the backed up data. To illustrate, a data time interval may define a time period during which data of interest was backed up. Thus, a data time interval of two days may mean that all data backed up within the two day period running backwards from a particular date/time of interest is to be retrieved and reconstructed. As another example, the data time interval may end at the most recent data, and extend as far back in time as desired. More generally, the data time interval can have any start date and any end date. The data time interval may be defined independently of where the data embraced by the data time interval is stored, and independently of the resolution of the data embraced by the data time interval.

Typically, high resolution data exists around the time of the backup creation date. If interval metadata does not exist, that information may be reconstructed by restoring the backup to a location to query, or by analyzing the backup data itself. Once such an analysis occurs, the results of the analysis, that is, identification of interval metadata, may be stored in metadata for future restores.

As noted herein, some of the data used in the reconstruction of a high resolution data stream may reside at one or more IoT devices. Thus, IoT devices may have an interface added to them to allow an external party to query any data that exists on the device. Inclusion of the interface is not required, but allows for the use of the IoT device as an additional data source for a data stream reconstruction process. In general, backup copies of the IoT device data may include metadata such as that described above in connection with the time series database.

Details concerning a particular example process for data stream reconstruction, which may also be referred to herein simply as 'reconstruction,' are provided in connection with the discussion of FIG. 3 below, however, a brief general discussion is provided here by way of introduction. In general, a data stream reconstruction process may begin when a data time interval to be retrieved is defined. As noted earlier, in one illustrative example, the data time interval may be up to the most recent data and may go back as far in time as needed. The data time interval may also be defined in terms of the backups performed, that is, the relative time position of one backup with respect to the time position of another backup. For example, a data time interval may extend from a most recent backup of data to the earlier of the two prior backups of that data, regardless of the actual time when any of these backups occurred.

A property of the time series databases, which may also be referred to as stream databases, such as those disclosed herein is that every entry is unique by metadata, which may be added during storage or backup, such as ID or timestamp. The metadata may be used to determine what data time interval of the backup is the high resolution portion. Other backups or portions of data, ordered by timestamp or other data, can then be added, in order, to the high resolution portion based on their respective time intervals.

Thus, during a data stream reconstruction process, overlapping data between sources of stored data can be easily resolved and insert operations are idempotent so that even an overlap will not cause issues. In general, the reconstruction of a data stream is performed by re-inserting the backed up data into a stream DB. Note that data retrieved from the database or database backup may be completely time synchronized already.

Data retrieved from the IoT device or its backup may be inserted into the data stream in the database based on the timestamp of when the sample data was taken. Reconstruction need not be performed for all of the data in a database. For example, in some embodiments, reconstruction may be performed for a subset of the data streams whose data is partly, or completely, stored in the database.

In some embodiments, data sources that store data usable in the reconstruction of a data stream may be accessed in a particular order, although that is not necessarily required and, in other embodiments, the order in which data sources are accessed may be arbitrary. In one example, but non-limiting, embodiment, data sources may be accessed as follows: first, the active time series DB; second, data in IoT device(s), which may store data not yet sent, that is, not yet backed up, to the backend DB; third, DB backups from the newest to the oldest; and, fourth, IoT device backups, from the newest (most recent) to the oldest (least recent). In this example, the ordering of the backups may be specified based on a need to provide for cost/speed optimizations in reconstructing a high resolution data stream, since older backups may be relatively harder to retrieve as compared to newer backups, and/or older backups may take relatively longer to retrieve than newer backups. Additional, or alternative, criteria may be used as a basis for determining the order in which backups are accessed for reconstruction of a high resolution data stream.

Figure 3:
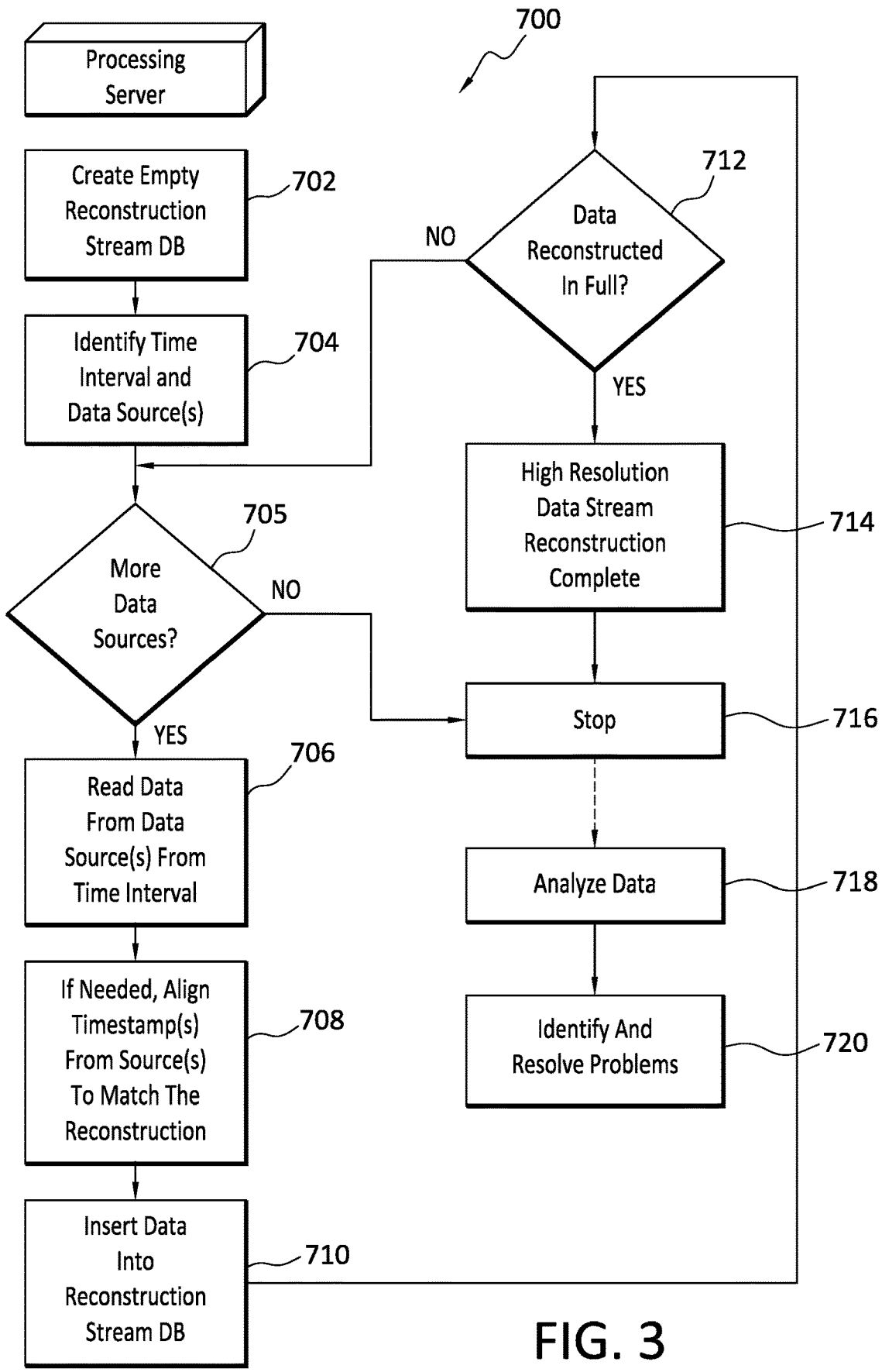
FIG. 3 is a flow diagram that discloses aspects of an example method for reconstruction of a high resolution data stream in accordance with various embodiments of the invention.

With attention now to FIG. 3, details are provided for some example methods for reconstructing a data stream, such as a high resolution data stream, one example of which is denoted generally at 700. In general, example methods such as the method 700 may be performed, in whole or in part, by and/or at a processing server. In other embodiments, methods such as the method 700 may be performed, in whole or in part, by and/or at a time series database. In still other embodiments, methods such as the method 700 may be cooperatively performed, in whole or in part, by and/or at a time series database and a processing server. As such, it will be appreciated that the allocation of functions disclosed in FIG. 3 is provided only by way of example, and those functions, as well as the other functions disclosed herein, can be allocated in any other suitable manner between or among the disclosed systems and devices.

As shown in the example of FIG. 3, the method 700 may begin when an empty reconstruction stream database is created 702. The empty reconstruction stream database may reside in storage at a cloud datacenter, on-premises at a client location, and/or in any other location. Creation of the empty reconstruction stream database 702 may be initiated by a user, such as an administrator, using an interface such as a graphical user interface (GUI) or command line interface (CLI) located at a processing server, for example. In some embodiments, creation of the empty reconstruction stream database may occur automatically in response to the occurrence of an event, examples of which include a spike in data, an operational error, or any other problem relating to a system, component and/or operating environment. The empty reconstruction stream database may correspond to a particular discrete data stream, or may be defined ad hoc.

Next, a data time interval, and associated data sources, are identified 704. As disclosed herein, the data time interval may, in some embodiments, be a period of time for which it is desired to reconstruct part of a high resolution data stream that may be a portion, or all of, an associated data stream that was initially created by an IoT device, for example. As such, the data time interval defines the limits of the high resolution data stream that is to be reconstructed, and the data time interval may correspond to a particular discrete data stream, or may be defined ad hoc. The data time interval may span a period of time during which a problem or other event occurred, where such problem or other event may be associated with, or detected by, an IoT edge sensor or other device, for example.

The data time interval may be manually specified by a user, or automatically, such as by the processing server for example. In connection with identification of the data time interval, the data source(s) that hold data which was stored or backed up, as applicable, during the data time interval are identified 704. Examples of the data sources include, but are not limited to, an IoT edge device, and a time series database.

A check 705 may be performed to determine if there are any more data sources to be identified. If not, the method 700 may proceed to 716 and stop. On the other hand, it the check 705 reveals that there are any remaining data sources to identify, the method 700 proceeds to 706.

In particular, when the data time interval is specified, and the associated data sources are known, the data corresponding to those data sources, for the data time interval specified, can then be read out 706. As noted herein, this data may be date stamped, or otherwise uniquely identified with some type of metadata, at the time of storage/backup, so that when the data is read out 706, the associated time sequence of each piece of data relative to other data in the data stream will be readily apparent, even when the data is stored in multiple sources.

As/if needed, the timestamps assigned by the data sources may be aligned to match the reconstruction 708, that is, the data may be aligned in chronological order. After the data has been ordered 708, the data can then be inserted 710 into the reconstruction stream database.

In some embodiments, the processes 704 . . . 710 may be repeated for each data source. Accordingly, a check 712 may be performed one or more times in which a determination is made as to whether the high resolution data stream has been fully reconstructed, such that there are no remaining data sources implicated by the data time interval and from which stored data has not already been retrieved. If the high resolution data stream has not been fully reconstructed, the method 700 returns to 705. On the other hand, if the high resolution data stream has been fully reconstructed, the method 700 advances to 714, indicating completion of the high resolution data stream. The method 700 then ends at 716.

When the method 700 is completed, the reconstructed high resolution data stream can then be accessed and various forensics, analyses, and/or other processes performed 718 with respect to the data in the high resolution data stream. Problems identified as a result of the analysis or other processes can then be identified and resolved 720.

As the example method 700 indicates, by combining data from multiple data sources not currently accessible, decorating the data with metadata and aligning the data timestamps, example systems and methods disclosed herein operate to reconstruct time series data at the highest resolution possible, even when the time series database no longer contains some or all of the data implicated by the reconstruction stream that has been defined. The data of the high resolution data stream can be used for forensics, scenario reproduction, and testing, for example.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a data time interval, wherein the data time interval defines a set of limits on data resolutions;
   identifying a data source in which data were stored during the data time interval, wherein the data are associated with respective timestamps that fall within the data time interval, and the data include a first portion of the data having a first resolution corresponding to a first storage rate at which the first portion of the data was stored in the data source, and the data include a second portion of the data having a second resolution that is less than the first resolution, and the second resolution corresponds to a second storage rate at which the second portion of the data was stored in the data source, and wherein the first storage rate and the second storage rate are based in part on a target resolution for a full data stream to be reconstructed using the first portion of the data and the second portion of the data;

reading the data from the data source;

performing part of a full data stream reconstruction process by ordering the read out data according to their respective timestamp and then inserting the ordered data into an empty reconstruction stream database and combining the inserted data from the data source with respective data read from one or more other data sources so as to create at least part of the full data stream having the target resolution, and the target resolution is higher than the resolution of the second portion of the data;

checking whether the full data stream has been reconstructed;

when the full data stream is determined to be reconstructed, processing the data of the full data stream; and based on the processing of the data, identifying and resolving a problem relating to an operating environment in which the data was initially generated.

2. The method as recited in claim 1, wherein the data source and/or one of the other data sources is an IoT edge device that comprises a sensor.

3. The method as recited in claim 1, wherein the full data stream resolution is full resolution.

4. The method as recited in claim 1, wherein checking whether the full data stream has been reconstructed includes determining whether or not the full data stream has been fully reconstructed such that there are no remaining data sources from which data stored during the time interval has not already been read out and combined into the full data stream.

5. The method as recited in claim 1, wherein the first storage rate and the second storage rate are also based in part on a storage capacity of the data source.

6. The method as recited in claim 1, wherein the data is retrieved from the data sources in a particular order of the data sources.

7. The method as recited in claim 1, wherein data stored in the data source was generated by that data source.

8. The method as recited in claim 1, wherein data is retrieved from the data sources in the following order, from first to last: an active time series database; an IoT device; one or more database backups from newest to oldest; and one or more IoT device backups from newest to oldest.

9. The method as recited in claim 1, wherein one of the data sources is a time series database, and data stored in the time series database is newer than data stored in the other data sources.

10. The method as recited in claim 1, further comprising downscaling one of the first portion of data and the second portion of data before, or after, the performing of the part of the data stream reconstruction process.

11. A non-transitory storage medium having stored therein instructions which are executable by one or more hardware processors to perform operations comprising:

identifying a data time interval, wherein the data time interval defines a set of limits on data resolutions;

identifying a data source in which data were stored during the data time interval, wherein the data are associated with respective timestamps that fall within the data time interval, and the data include a first portion of the data having a first resolution corresponding to a first storage rate at which the first portion of the data was stored in the data source, and the data include a second portion of the data having a second resolution that is less than the first resolution, and the second resolution corresponds to a second storage rate at which the second portion of the data was stored in the data source, and wherein the first storage rate and the second storage rate are based in part on a target resolution for a full data stream to be reconstructed using the first portion of the data and the second portion of the data;

reading the data from the data source;

performing part of a full data stream reconstruction process by ordering the read out data according to their respective timestamp and then inserting the ordered data into an empty reconstruction stream database and combining the inserted data from the data source with respective data read from one or more other data sources so as to create at least part of the full data stream having the target resolution, and the target resolution is higher than the resolution of the second portion of the data;

checking whether the full data stream has been reconstructed;

when the full data stream is determined to be reconstructed, processing the data of the full data stream; and based on the processing of the data, identifying and resolving a problem relating to an operating environment in which the data was initially generated.

12. The non-transitory storage medium as recited in claim 11, wherein the data source and/or one of the other data sources is an IoT edge device that comprises a sensor.

13. The non-transitory storage medium as recited in claim 11, wherein the full data stream resolution is full resolution.

14. The non-transitory storage medium as recited in claim 11, wherein further comprising checking whether the full data stream has been reconstructed includes determining whether or not the full data stream has been fully reconstructed such that there are no remaining data sources from which data stored during the time interval has not already been read out and combined into the full data stream.

15. The non-transitory storage medium as recited in claim 11, wherein the data source and/or one of the other data sources is a time series database, and data stored in the time series database has a higher resolution than a resolution of data stored in another of the data sources.

16. The non-transitory storage medium as recited in claim 11, wherein the data is retrieved from the data sources in a particular order of the data sources.

17. The non-transitory storage medium as recited in claim 11, wherein data stored in the data source was generated by that data source.

18. The non-transitory storage medium as recited in claim 11, wherein data is retrieved from the data sources in the following order, from first to last: an active time series database; an IoT device; one or more database backups from newest to oldest; and one or more IoT device backups from newest to oldest.

19. The non-transitory storage medium as recited in claim 11, wherein one of the data sources is a time series database, and data stored in the time series database is newer than data stored in the other data sources.

20. The non-transitory storage medium as recited in claim 11, wherein the operations further comprise downscaling one of the first portion of data and the second portion of data before, or after, the performing of the part of the data stream reconstruction process.

\* \* \* \* \*